(12) United States Patent
Dedu-Constantin et al.

(10) Patent No.: US 7,895,173 B1
(45) Date of Patent: Feb. 22, 2011

(54) SYSTEM AND METHOD FACILITATING UNIFIED FRAMEWORK FOR STRUCTURED/UNSTRUCTURED DATA

(75) Inventors: Daniel Dedu-Constantin, Redmond, WA (US); Omri Gazitt, Redmond, WA (US); Michael J. Pizzo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 11/190,678

(22) Filed: Jul. 27, 2005

Related U.S. Application Data

(62) Division of application No. 09/894,653, filed on Jun. 27, 2001, now abandoned.

(51) Int. Cl.
*G06F 7/00* (2006.01)
*G06F 17/00* (2006.01)
*G06F 17/30* (2006.01)

(52) U.S. Cl. .................. 707/705; 707/690; 707/803
(58) Field of Classification Search .................. None
See application file for complete search history.

(56) References Cited

U.S. PATENT DOCUMENTS

| | | | |
|---|---|---|---|
| 5,276,835 A | 1/1994 | Mohan et al. | |
| 5,280,611 A | 1/1994 | Mohan et al. | |
| 5,287,473 A | 2/1994 | Mohan et al. | |
| 5,327,556 A | 7/1994 | Mohan et al. | |
| 5,842,212 A * | 11/1998 | Ballurio et al. | 707/100 |
| 6,047,267 A | 4/2000 | Owens et al. | |
| 6,128,619 A | 10/2000 | Fogarasi et al. | |
| 6,173,439 B1 | 1/2001 | Carlson et al. | |
| 6,185,572 B1 | 2/2001 | Blackman et al. | |
| 6,233,586 B1 | 5/2001 | Chang et al. | |
| 6,236,988 B1 | 5/2001 | Aldred | |
| 6,263,328 B1 | 7/2001 | Coden et al. | |
| 6,263,342 B1 | 7/2001 | Chang et al. | |

(Continued)

OTHER PUBLICATIONS

Mark Birbeck, "X-Schemn", Jun. 23. 1999, http://mailman_ic.oc.uWpipermail/xml-dev/1999-June/013125.html.

(Continued)

*Primary Examiner*—Susan Y Chen
(74) *Attorney, Agent, or Firm*—Workman Nydegger

(57) ABSTRACT

A system and method facilitating a unified framework for accessing structured and unstructured data is provided. The invention includes a source document having data that is parsed into a data document component providing a hierarchical representation of data associated with the source document and a data set component providing a relational representation of at least a portion of the data associated with the source document. The invention further provides for a schema defining a structure of the relational representation to be associated with the source document and/or inferred by the data set component. Data stored in the data document component and the data set component are synchronized, thus a change made to data stored in the data set component is reflected in data stored in the data document component. Further, a change made to data stored in the data document component is reflected in data stored in the data set component if utilized according to the schema. The invention further provides for a service to access the hierarchical representation of data associated with the source document and/or a designer to access the relational representation of data associated with the source document.

17 Claims, 10 Drawing Sheets

U.S. PATENT DOCUMENTS

| | | | |
|---|---|---|---|
| 6,356,913 | B1 | 3/2002 | Chu et al. |
| 6,356,920 | B1 | 3/2002 | Vandersluis |
| 6,370,537 | B1 | 4/2002 | Gilbert et al. |
| 6,418,446 | B1 | 7/2002 | Lection et al. |
| 6,418,448 | B1 * | 7/2002 | Sarkar ............. 707/104.1 |
| 6,643,633 | B2 | 11/2003 | Chau et al. |
| 6,721,727 | B2 | 4/2004 | Chau et al. |
| 6,850,252 | B1 | 2/2005 | Hoffberg |
| 6,999,956 | B2 | 2/2006 | Mullins |
| 7,096,224 | B2 * | 8/2006 | Murthy et al. ............. 707/100 |
| 2002/0019824 | A1 | 2/2002 | Holder et al. |
| 2002/0156772 | A1 | 10/2002 | Chau et al. |
| 2002/0198798 | A1 | 12/2002 | Ludwig et al. |
| 2003/0065738 | A1 | 4/2003 | Yang et al. |
| 2005/0149572 | A1 | 7/2005 | Karai et al. |

OTHER PUBLICATIONS

Abstracts of Some fo C. Mohan's Papers and Patents, Updated on Jun. 13, 2001, www.almaden.ibm.com/u/mohan/aries_papers.html, accessed Jul. 24, 2001, pp. 1-38.

C. Mohan, et al., "A Case Study of Problems in Migrating to Distributed Computing: Data Base Recovery Using Mulitple Logs in the Shared Disks Environment", IBM Research Report RJ7343, Database Technology Institute, IBM Almaden Research Center, Mar. 1990, 20 pages.

C. Mohan, et al., "Recovery and Coherency-Control Protocols for Fast Intersystem Page Transfer and Fine-Granularity Locking in a Shared Disks Transaction Environment", Proceedings of the 17th International Conference on Very Large Data Bases, Sep. 1991, pp. 193-207, Barcelona.

C. Mohan, et al., Research Report RJ8017 entitled, "Recovery and Coherency-Control Products for Fast Intersystem Page Transfer and Fine-Granularity Locking in a Shared Disks Transaction Environment", Data Base Technology Institute, IBM, Alamaden Research Center, Mar. 15, 1991, 31 pages.

C. Mohan, et al., "Solutions to Hot Spot Problems in a Shared Disks Transaction Environment", IBM Research Report RJ8281, Data Base Technology Institute, IBM, Alamaden Research Center, Aug. 1991, 25 pages.

C. Mohan, et al., *"Efficient Locking and Caching of Data in the Multisystem Shared Disks Transaction Environment"*, Proc. 3rd International Conference on Extending Database Technology, Mar. 1992, pp. 453-468, Viennia.

C. Mohan, et al., "Efficient Locking and Caching of Data in the Multisystem Shared Disks Transaction Environment", Data Base Technology Institute, IBM Almaden Research Center, RJ 8301, Aug. 1991, 20 pages.

C. Mohan, et al., "Data Base Recovery in Shared Disks and Client-Server Architectures", Proc. 12th International Conference on Distributed Computing Systems, Yokohama, Jun. 1992, pp. 310-317.

C. Mohan, et al., "Data Base Recovery in Shared Disks and Client-Server Architectures", IBM Research Report RJ8685, Data Base Technology Institute, IBM Almaden Research Center, Mar. 1992, 20 pages.

J. W. Josten, et al., "DB2's Use of the Coupling Facility for Data Sharing", IBM Systems Journal, 1997, 25 pages, vol. 36, No. 2.

U.S. Appl. No. 09/894,653, mail date Oct. 27, 2003, Office Action.
U.S. Appl. No. 09/894,653, mail date Mar. 30, 2004, Office Action.
U.S. Appl. No. 09/894,653, mail date Oct. 20, 2005, Office Action.
U.S. Appl. No. 09/894,653, mail date May 1, 2006, Office Action.
U.S. Appl. No. 09/894,653, mail date Nov. 30, 2006, Office Action.
U.S. Appl. No. 09/894,653, mail date May 1, 2007, Office Action.
U.S. Appl. No. 09/894,653, mail date Dec. 26, 2007, Office Action.
U.S. Appl. No. 09/894,653, mail date Jul. 22, 2008, Office Action.

* cited by examiner

SYSTEM AND METHOD FACILITATING UNIFIED FRAMEWORK FOR STRUCTURED/UNSTRUCTURED DATA

CROSS REFERENCE TO RELATED APPLICATIONS

This application is a divisional of U.S. patent application Ser. No. 09/894,653, filed Jun. 27, 2001, and entitled, "SYSTEM AND METHOD FACILITATING UNIFIED FRAMEWORK FOR STRUCTURED/UNSTRUCTURED DATA." This application is also related to co-pending U.S. Continuation patent application Ser. No. 11/191,120, filed Jul. 25, 2005, entitled, "SYSTEM AND METHOD FACILITATING UNIFIED FRAMEWORK FOR STRUCTURED/UNSTRUCTURED DATA" and co-pending U.S. Divisional patent application Ser. No. 11/190,679, filed Jul. 25, 2005, and entitled, "SYSTEM AND METHOD FACILITATING UNIFIED FRAMEWORK FOR STRUCTURED/UNSTRUCTURED DATA". The entireties of the aforementioned applications are incorporated herein by reference.

TECHNICAL FIELD

The present invention relates generally to computer systems, and more particularly to a system and method facilitating a unified framework for structured/unstructured data.

BACKGROUND OF THE INVENTION

Storage of information in a storage medium may be facilitated using a database in conjunction with a database management system (DBMS). A database is a collection of related data that may be stored on a nonvolatile memory medium. Data in the database is commonly organized in a two-dimensional row and column form called a table. A database typically includes multiple tables.

A table is an object in the database having at least one record and at least one field within each record. Thus, a table may be thought of as an object having two-dimensional record and field organization. A record is a row of data in the table that is identified by a unique numeric called a record number. A field is a subdivision of a record to the extent that a column of data in the table represents the same field for each record in the table. Each field in a record is identified by a unique field name and a field name remains the same for the same field in each record of the table. Therefore, a specific datum in a table is referenced by identifying a record number and a field name.

A database management system (DBMS) is a control system that supports database features including, but not limited to, storing data on a memory medium, and retrieving data from the memory medium. Data in the database is typically organized among a plurality of objects that include, but are not limited to, tables and queries. An individual table or query may be referred to as a record source because it is a source of data or records from the database. A query object is an executable database interrogation statement, command, and/or instruction that communicates to the database management system the identity and location of data being extracted from the database. The product of an executed query is called a result set. A result set may be stored and/or manipulated as a two-dimensional object similar to the table discussed previously.

Conventionally, one of the prevalent forms of data organization is a relational database. A relational database can be managed by a database management system and/or a managed provider. Data in a relational database is distributed among multiple record sources that are typically related, or normalized, in a manner designed to minimize redundant data in the database, minimize the space required to store data in the database, and maximize data accessibility. Record sources in a database may be related to one another via key fields. A normalized database is one where each record source in the database is directly related to at least one other record source in the same database by key fields.

A key field can be a primary key or a foreign key. A primary key is a field or combination of fields in a record source that includes unique data for each record in the table. A foreign key is any non-primary key in a record source that is the basis for a direct relation with any other record source. A database remains a relational database regardless of the degree of normalization that exists. Record sources in a normalized relational database are typically related. However, a relational database may be normalized even if the database is disconnected in that at least one record source in the database is not related to any other record source by a key field.

Relationships between any two record sources in a relational database may be either direct or indirect. Such a relationship may also be referred to as a relation or join. A direct relationship exists between two record sources if there is no intervening record source in the relationship path there between. An indirect relationship exists if there is at least one intervening record source in the relationship path between two record sources.

The record sources in a relational database and the relationships there between define the geography of a database, which may be called a database schema. A sub-schema of the database is any subset of the full database schema that is defined by a query, a result set of a query, or any other subset of record sources from the database. A database schema and database sub-schema may be displayed visually in graphic form as a graph having edges or arrows representing relationships between record sources, and vertices, also known as nodes or tables, representing the record sources at either end of a relationship.

Queries are used to access data in a database. A query may be constructed in a Structured Query Language (SQL) that may or may not be based on the American National Standards Institute (ANSI) standard SQL definition. To access data in a database, a user may construct a query using an SQL. Executing a query is called a join or joining wherein each relation identified in the query is joined during execution to retrieve the desired data from a database.

However, for many applications, the limitations of the relational database (e.g., homogeneity of records in a table, homogeneity of relationship between parent(s) and children) have conventionally proven difficult to overcome. For example, there can be fields for one customer in the relational database that don't exist for another customer.

Markup languages (e.g., Hypertext Markup Language ("HTML"), Standard Generalized Markup Language ("SGML") and the Extensible Markup Language ("XML")) contain text and a number of tags which provide instructions as to how the text should be displayed, which text should be hyperlinked to other documents, and where other types of content, including graphics and other images, video and audio segments, application programs or applets, image maps, and icons, that should be retrieved from and displayed in the document. Some document languages such as SGML and XML can represent documents as trees with each node of the tree labeled with a tag and each node's immediate descendants taking in order having tags that satisfy a production corresponding to the parent's tag. Therefore, a document can be represented as a complete parse tree satisfying the production rules of a grammar. XML was created by the World Wide Web Consortium to overcome the shortcomings of HTML. XML allows a document developer to create tags that describe the data and create a rule set referred to as a Document Type Definition (DTD) to apply to the data rules to the data. Several XML parsers have evolved that can read, decode and validate the text based document extracting the data elements in a platform independent way so that applications can access the data objects according to another standard referred to as the Document Object Model (DOM). DOM is an application program interface (API) that defines a standard for developer interaction with XML data structured tree elements. Therefore, XML document and DOM or XML DOM provides developers with programmatic control of XML document content, structure, and formats by employing script, Visual Basic, C++ and other programming languages. In the most abstract form, data stored in an XML document(s) can be completely unstructured.

With the historical use of relational databases and increasing use of mark-up languages (e.g., XML), there is an unmet need in the art for a unified framework for accessing data (e.g., XML document(s) and/or relational database document (s)).

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method for providing a unified access to structured (e.g., relational) and unstructured (e.g., XML hierarchical) data. More particularly, the present invention relates to the ability of an Application Programming Interface (API) to access data (e.g., XML document and/or relational database document) as unstructured data (e.g., hierarchical) and as structured data (e.g., relational model).

In accordance with an aspect of the present invention, a source document (e.g., hierarchical data document such as an XML document) is parsed into a data document (e.g., hierarchical representation) and a data set (e.g., relational representation). The data set represents a structured representation of some or substantially all of the information in the data document. The structured representation of the data set can be defined by a schema (e.g., user defined) or inferred based upon information associated with the source document (e.g., XML document). The data document (e.g., hierarchical representation) and the data set (e.g., relational representation) are synchronized, thus, change(s) made to data contained in the data document (e.g., by an API) can be reflected in the data set (e.g., relational representation), if utilized based upon the schema (e.g., user defined or inferred). Further, change(s) made to data contained in the data set can be reflected in the data document (e.g., unstructured representation). Thus, information contained in a source document (e.g., XML document) can be accessed as structured data (e.g., relational model) via the data set and/or as unstructured data via the data document (e.g., hierarchical representation).

In accordance with another aspect of the invention, information associated with a relational database document can be loaded into a data document component (e.g., hierarchical representation) and a data set component (e.g., relational representation). Further, service(s) can utilize information stored in the data document and/or designer(s) can access information stored in the data set.

Another aspect of the invention relates to a computer readable medium having computer executable components for accessing data. One of the components is an XML data document component adapted to having a hierarchically represent information associated with a source document. Another of the components is a data set component adapted to relationally represent at least some of the information associated with the source document, the XML data document component and the data set component being mappable to each other.

Yet another aspect of the invention relates to a data packet adapted to be transmitted between two or more computer processes. One or more first data fields associated with the data packet are adapted to store a hierarchical representation of information associated with a source document. One or more second data fields are adapted to store mapping instructions relating to mapping the hierarchical representation of information to a relational representation of the source document.

Another aspect of the invention relates to a data packet adapted to be transmitted between two or more computer processes. One or more first data fields are adapted to relationally represent at least some of the information associated with the source document; and one or more second data fields are adapted to store mapping instructions relating to mapping the relational representation of information to a hierarchical representation of the source document.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
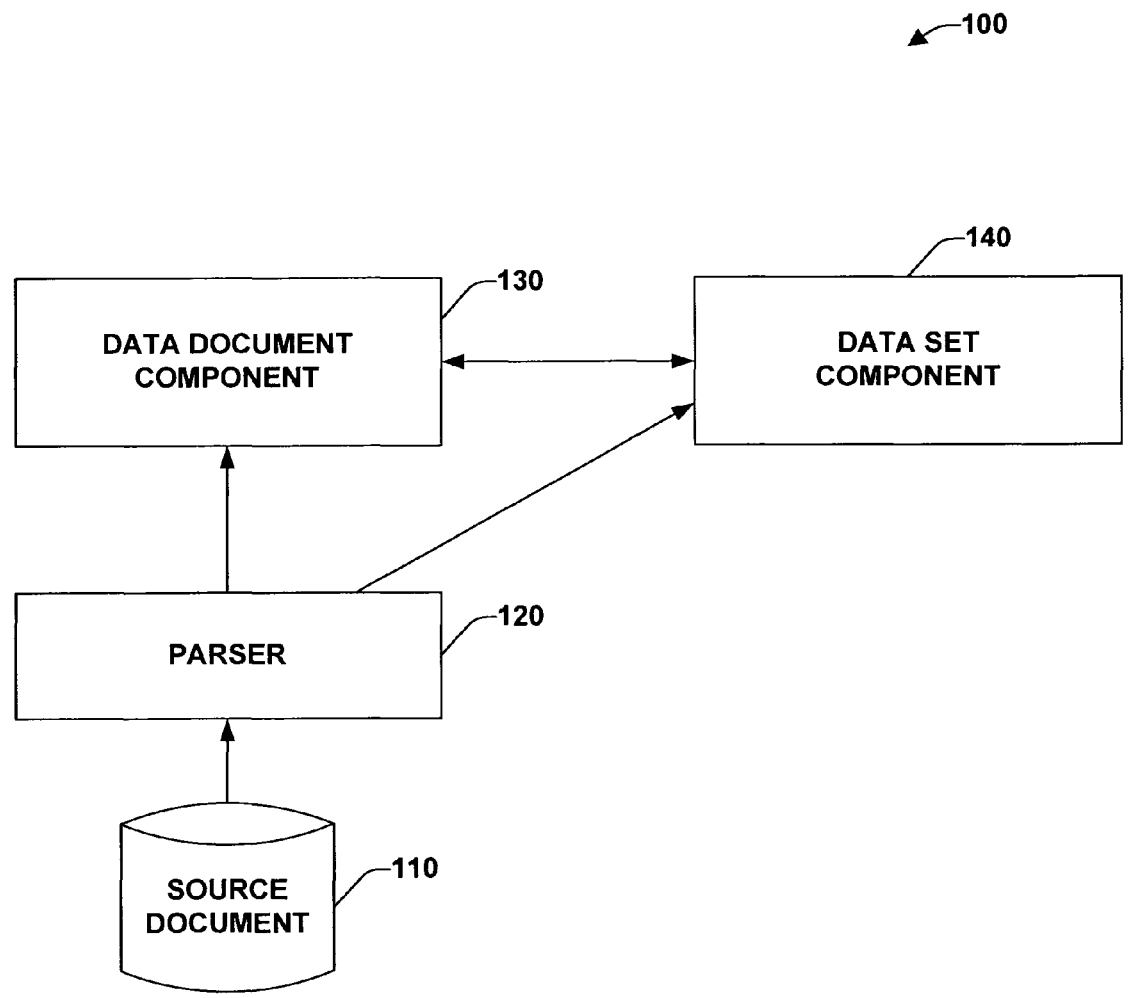
FIG. 1 is a schematic block diagram of a system facilitating access of a source document in a structured and unstructured manner in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

Referring to FIG. 1, a system 100 facilitating access of a document in a structured and unstructured manner is illustrated. The system 100 includes a source document 110, a parser 120, a data document component 130 and a data set component 140. For example, the source document 110 can be an XML document having data organized in a hierarchical manner. The parser 120 can access information associated with the source document 110 (e.g., XML document) and store information associated with the source document 110 in a hierarchical manner (e.g., tree of node(s)) in the data document component 130. The parser 120 can access information associated with the source document 110 that defines, at least in part, a schema for storing at least a portion of information associated with the source document 110 into a relational data structure. Additionally, the parser 120 can send information associated with the source document 110 to the data set component 140 which the data set component 140 can utilize to infer a relational structure of the source document 110.

Once data associated with the source document 110 has been loaded into the data document component 130 and the data set component 140, it can be accessed by a user (e.g., via an application program interface (API)). Changes to data stored in the data set component 140 are reflected in the data stored in the data document component 130. However, changes to data stored in the data document component 130 are reflected in the data stored in the data set component 140 only if the changed data is associated with the relational data stored in the data set component 140. Thus, integrity of the source document 110 is maintained in the data stored in the data document component 130 while the data set component 140 (e.g., mapped to the data set component 140) can maintain all or a subset of data associated with the source document 110.

The data document component 130 can associate region(s) of stored data with data stored in the data set component 140. For example, the data document component 130 can associate a region of data with a row of data stored in the data set component 140. Further, for data stored in the data document component 130 having nodes with the same identifier, the data set component 140 can associate a particular field of data. For example, for a data document component 130 having two elements identified by "name", the first instance of "name" can be mapped to the data set component 140 with the second instance not mapped to the data set component 140.

For example, under one schema, a region of a data document component 130 generally can be associated (e.g., mapped) with a row of data in a data set component 140. The topmost node (e.g., subset) of the associated region can be an element having, for example, the same local name and namespace as the corresponding properties of an associated data table in the data set component 140. Thus a node of the data document component 130 can have three possible states: (1) the node can be associated with a row of data in the data set component 140 (e.g., if it's local name/namespace match the corresponding properties in the data table in the data set component 140); (2) the node can belong to a region (e.g., the region defined by the closest parent that is associated with a row of data in the data set component 140); and (3) the node can belong to no region (e.g., if no parent is associated with a row of data in the data set component 140). Within a region, element(s) and/or attribute(s) can be mapped to corresponding column(s) and/or field(s) of a row of data in the data set component 140. Under this schema, if more than one of the element(s) has the same corresponding column, then the first one occurrence of the element is mapped to the data set component 140 with the remaining occurrence(s) not mapped into the data set component 140. For an attribute mapped to a column and/or field, the value of the column and/or field is the value of the attribute. For an element mapped to a column and/or field, the value of the column and/or field can be the concatenation of the first run of consecutive text-like nodes, starting, for example, with the first child in the hierarchical representation of the data document component 130. Node(s) of the data document component 130 not mapped to the data set component 140 are preserved in the data document component 130. Thus, changes to unmapped node(s) have no direct effect on the data set component 140. However, changes to unmapped node(s) can have an indirect effect on the data set component 140 (e.g., if a change to unmapped node(s) triggers another change to node(s) mapped to the data set component 140).

Under this schema, an XML file having the following information:

<root>
  <customer>
    <foo/>
    <name>Daniel</name>
    <city>Redmond<bar/></city>
    <customer>
      <bar2/>
    </customer>
    <city>Seattle</city>
  </customer>
</root> can be mapped as a data table to the data set component 140 as follows:
    Table name: customer
    First column: name
    Second column: city In this example, there are two regions, each of which has a top node of "customer". The root node is not mapped to data set component 140. The first "customer" element is mapped to a row in the "customer" data table. The second "customer" element is mapped to another row in the "customer" data table. The first region includes the first "customer", "foo", "name", "city", "bar" and second "city" elements. The second region contains the second "customer" element and the "bar2" element. The "name" element is mapped to the "name" column and/or field of the row mapped to the first "customer" element. Both "city" elements can correspond to the "city" column of the "customer" table; however, under this schema, only the first occurrence is mapped (e.g., change(s) to the second occurrence in the data document component 130 will not be synchronized to the data set component 140). In the "customer" data table of the data set component 140, the value of the "name" column for the first row is "Daniel". The value of the "city" column for the first row is "Redmond" (e.g., despite the fact that it also contains a "bar" element). The second row of the data table of the data set component 140 does not have any information since the element "bar2" does not correspond to any data mapped to the data set component 140.

It is to be appreciated that the above schema has been utilized for the purpose of illustration and not for limiting of the present invention. Those skilled in the art will recognize that the present invention is not limited to use of the above schema but also can be employed with other schema(s).

Figure 2:
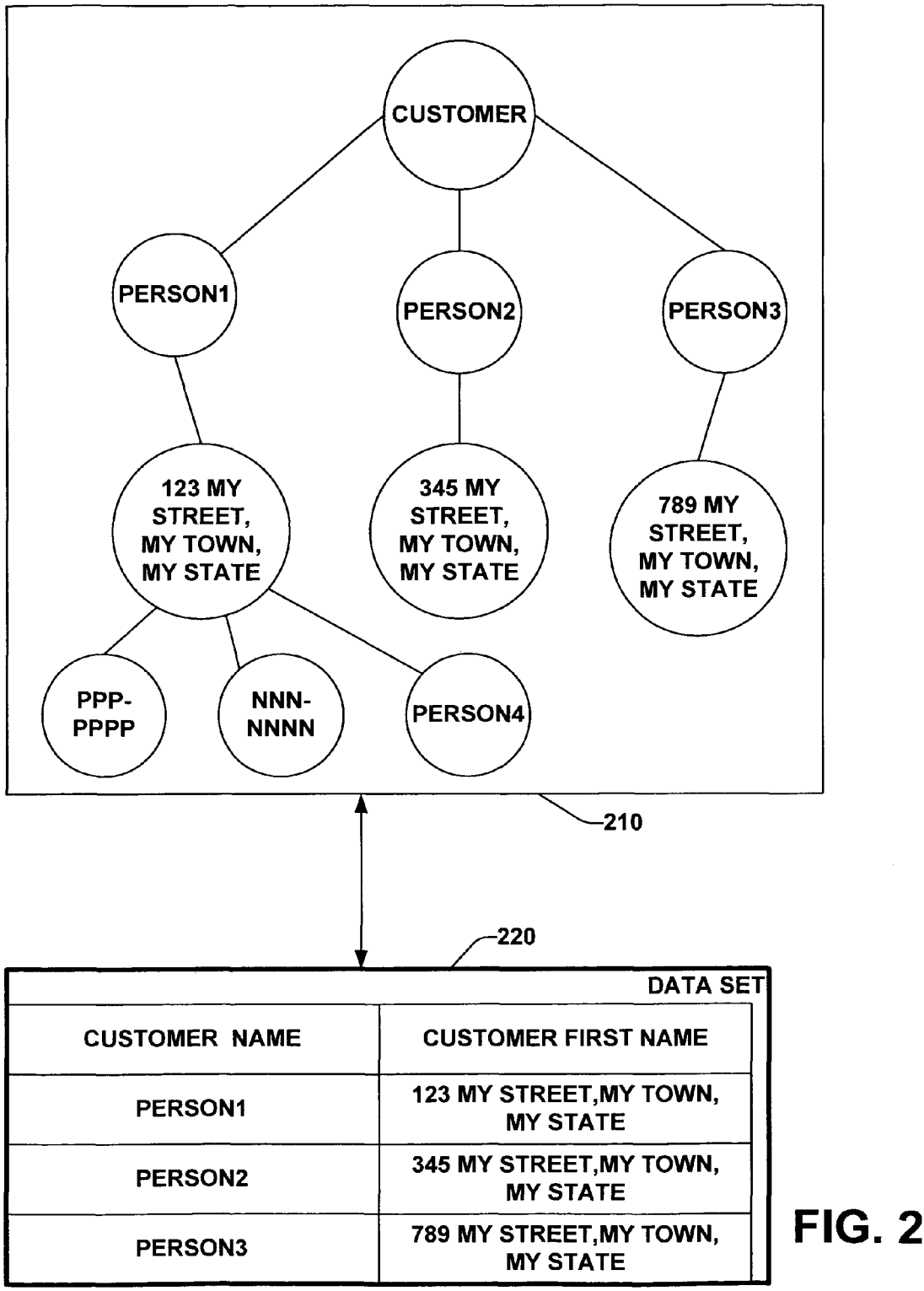
FIG. 2 is a representation of a data document data structure and a corresponding data set data structure in accordance with an aspect of the present invention.

Turning to FIG. 2, a data document data structure 210 and an associated data set data structure 220 in accordance with an aspect of the present invention is illustrated. The example of FIG. 2 illustrates a data document data structure 210 having a hierarchical structure of customer information for three customers: (1) PERSON1 having an address of 123 My Street, My Town, My State, phone number of PPP-PPPP, a fax number of NNN-NNNN and an associated person named PERSON4, (2) PERSON2 having an address of 345 My Street, My Town, My State, and (3) PERSON3 having an address of 789 My Street, My Town, My State. Information stored in the data document data structure 210 can be unstructured. Using a schema mapping customer name and address of the same data, a relational view is illustrated in the associated data set data structure 220. In the data set data structure 220, the information not included within the schema (either defined or inferred), is not included. Accordingly, in this example, PERSON1's phone number, fax number and associated person are not available to a user via the data set data structure 220 but would be available to a user via the data document data structure 210. Changes made to the information in the data set data structure 220 would be made to information in the data document data structure 210. For example, if PERSON3's name was changed to PERSON5 by a user in the data set data structure 220, the change would be reflected in the data document data structure 210. Further, adding a field to information stored in the data set data structure 220 results in a new node in the corresponding data document data structure 210. However, changes in the data document data structure 210 are not necessarily reflected in the data set data structure 220. For example, if PERSON1's telephone number changed to PPP-PPPX, since the schema for the data set data structure 220 did not include a telephone number field, the change would not be reflected in the data set data structure 220. In this manner, integrity of the hierarchical data is maintained in the data document data structure 210 while allowing for access of all or some of the information in a relational manner via the data set data structure 220.

Figure 3:
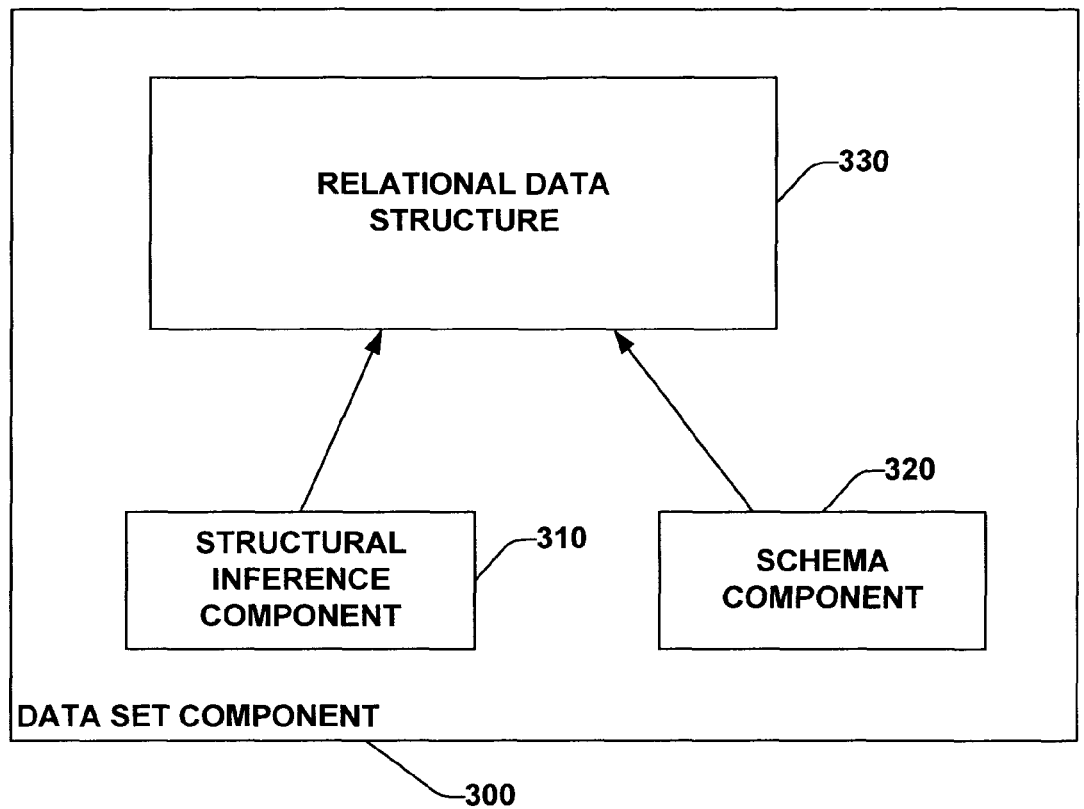
FIG. 3 is a schematic block diagram of a data set component in accordance with an aspect of the present invention.

Next, referring to FIG. 3, a data set component 300 is illustrated. The data set component 300 can include relational data structure 330, a structural inference component 310 and/or a schema component 320. A source document 110 can include an associated schema for the schema component 320 of the data set component 300 to use in mapping data from the source document 110 into the relational data structure 330. For example, the associated schema can describe the column(s) and type(s) of data in each column as well as associating node(s) of the hierarchical data source (e.g., XML) to with the different column(s) and table(s) of the relational data structure 330.

In the event that the source document does not include an associated schema, the structural inference component 310 can infer a structure of the source document 110 and load the relational data structure 330 based at least in part upon the inferred structure. The structural inference component 310 can extract element(s) that would be defined as table(s) with the remaining element(s) defined as column(s) in one of the defined table(s).

For example, the structural inference component 310 can first define element(s) with attribute(s) as table(s). Next, the structural inference component 310 can define element(s) that contain another element(s) as table(s). The structural inference component 310 can further determine that element(s) with the same name found more than once as table(s). The structural inference component 310 can further define direct children of a root node as table(s). The structural inference component 310 can define as a column information that has not been defined as a table with row(s) created from the contents of the source document 110.

Figure 4:
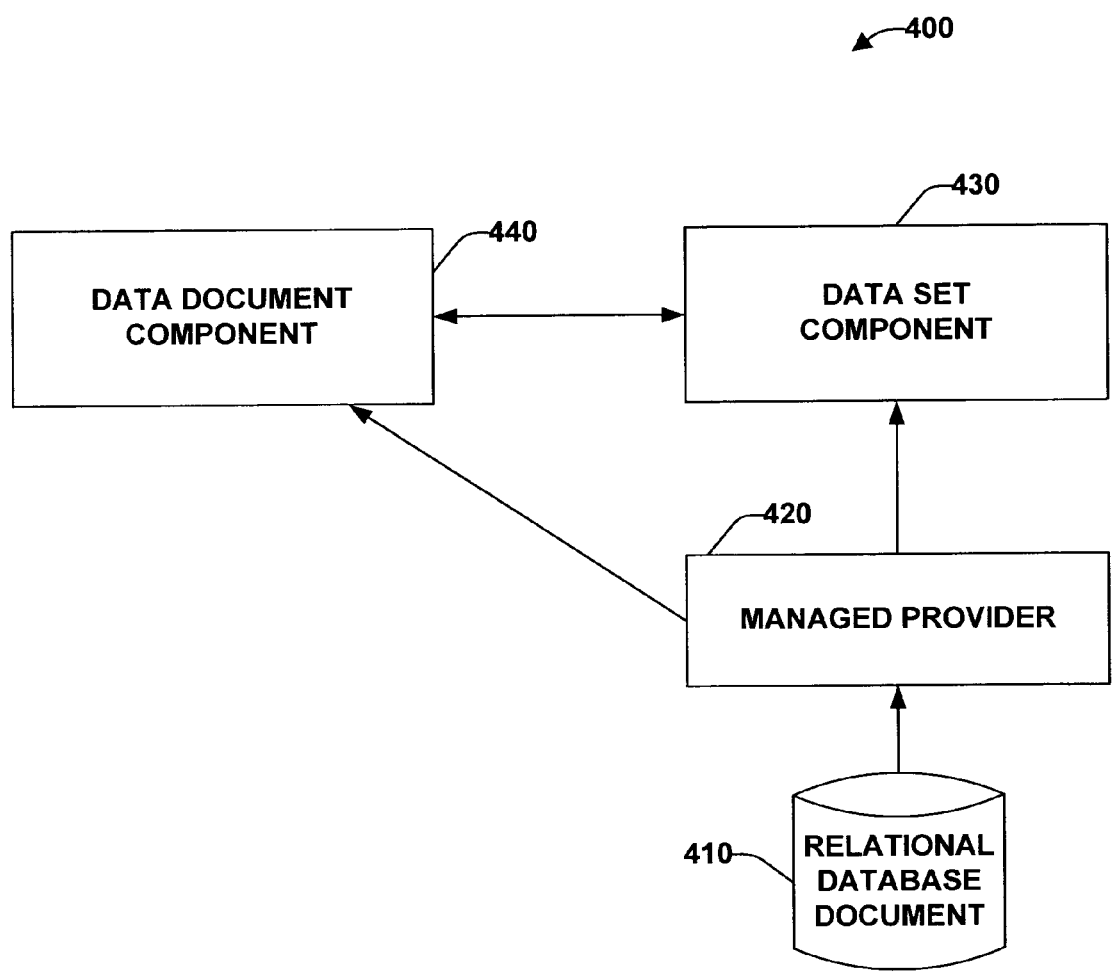
FIG. 4 is a schematic block diagram of a system facilitating access of a relational database document in a structured and unstructured manner in accordance with an aspect of the present invention.

Referring to FIG. 4, a system 400 facilitating access of a relational database document in structured and unstructured manner is illustrated. The system 400 includes a relational database document 410, a managed provider 420, a data set component 430 and a hierarchical data document component 440. The managed provider 420 can retrieve data stored in the relational database document 410 and load the data set component 430. The data set component 430 and/or the managed provider 420 can then load data associated with the relational database document 510 into the hierarchical data document component 440. Accordingly, data associated with the relational database document 410 can be available to a user in both a hierarchical manner via the data document component 440 and a relational manner via the data set component 430. Changes made to data in the data set component 430 are correspondingly made to data document component 440. However, changes made to data stored in the data document component 440 are not necessarily made to data stored in the data set component 430. For example, if a node is added to data stored in the data document component 440, data associated with the added node would not necessarily be reflected in information stored in the data set component 430.

Figure 5:
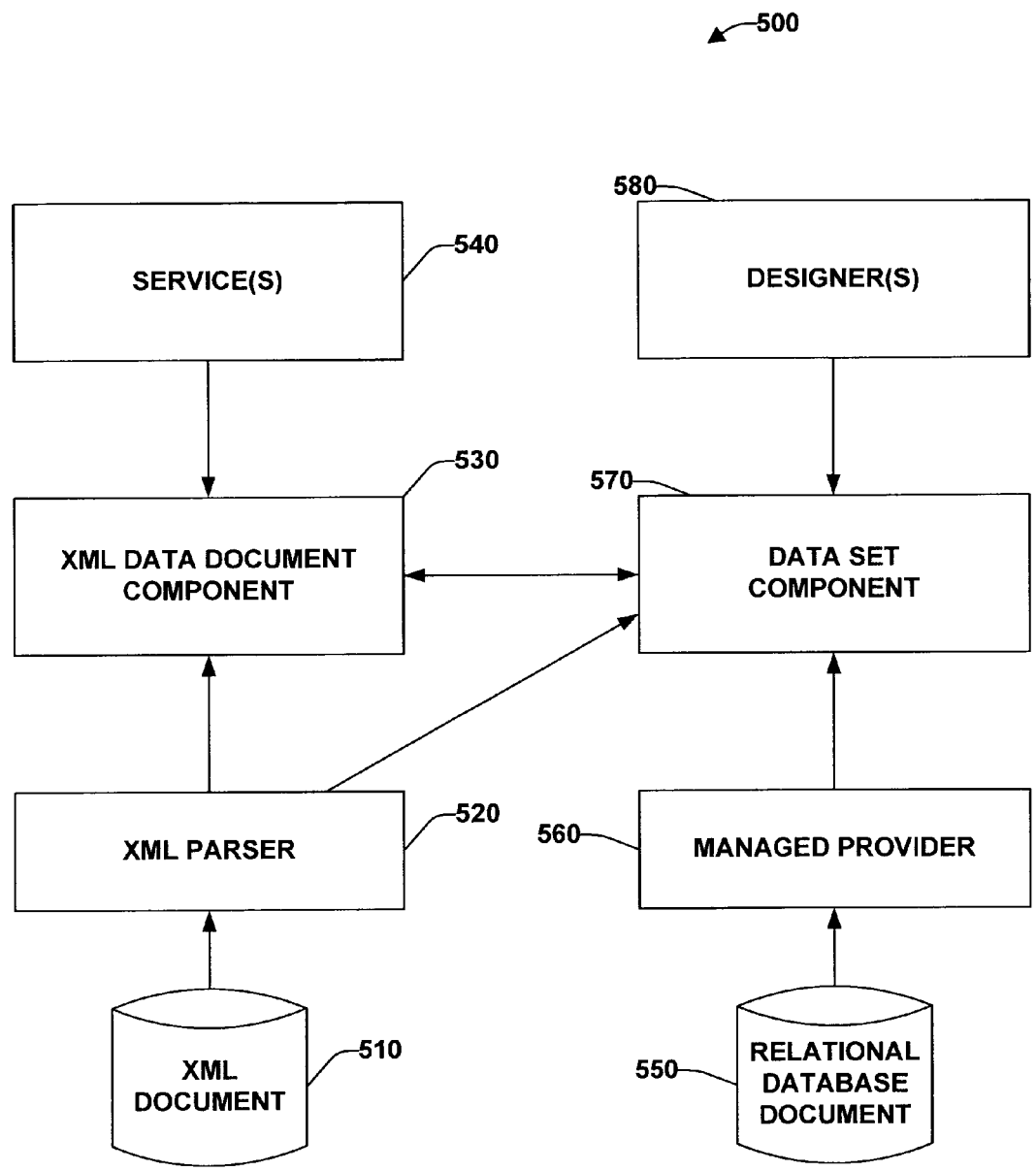
FIG. 5 is a schematic block diagram of a system facilitating access of hierarchical data and/or relational data in a structured and unstructured manner in accordance with an aspect of the present invention.

Turning to FIG. 5, a system 500 facilitating access of hierarchical data (e.g., XML document) and/or relational data (e.g., relational database document) in a structured and unstructured manner is illustrated. The system 500 includes at least one of an XML document 510 and a relational database document 550. The system 500 further can include an XML parser 520, an XML data document component 530, a managed provider 560, a data set component 570, service(s) 540 and designer(s) 580. The XML parser 520 can access the XML document 510 and store information associated with the XML document 510 in a hierarchical manner (e.g., tree of node(s)) in the XML data document component 530. The XML parser 520 can access information associated with the XML document 510 that defines, at least in part, a schema for storing at least a portion of data associated with the XML document 510 into a relational data structure within the data set component 570. Additionally, the XML parser 520 can send information associated with the XML document 510 to the data set component 570 which the data set component 570 can utilize to infer a relational structure of the XML document 510.

Once information associated with the XML document 510 has been loaded into the XML data document component 530 and the data set component 570, it can be accessed by a user (e.g., via an application program interface (API)). Changes to information stored in the data set 540 are reflected in the information stored in the XML data document component 530. However, changes to information stored in the XML data document component 530 are reflected in the information stored in the data set component 570 only if the changed information is associated with the relational information stored in the data set component 570. Thus, integrity of the XML document 510 is maintained in the information stored in the XML data document component 530 while the data set component 570 can maintain all or a subset of information associated with the XML document 510.

Further, the managed provider 560 can retrieve data stored in the relational database document 550 and load the data set component 570. The data set component 570 can then load information associated with the relational database document 550 into the XML data document component 530. Accordingly, data associated with the relational database document 550 can be available to a user in both a hierarchical manner via the XML data document component 530 and a relational manner via the data set component 570. Changes made to data in the data set component 570 are correspondingly made to XML data document component 530. However, changes made to the XML data document component 530 are not necessarily made to information stored in the data set component 570. For example, if a node is added to information stored in the XML data document component 530, information associated with the added node would not necessarily be reflected in information stored in the data set component 570.

The designer(s) 580 can include design tool(s) providing design time support for visually manipulating component(s), especially visual component(s) such as forms and controls. The designer(s) 580 can access information associated with the XML document 510 and/or relational database document 550 via the data set component 570 as relational data (e.g., homogenous table(s) of column(s) and row(s)). The service(s) 540 can access information associated with the XML document 510 and/or relational database document 550 via the XML data document as hierarchical data (e.g., tree of node(s)).

Figure 6:
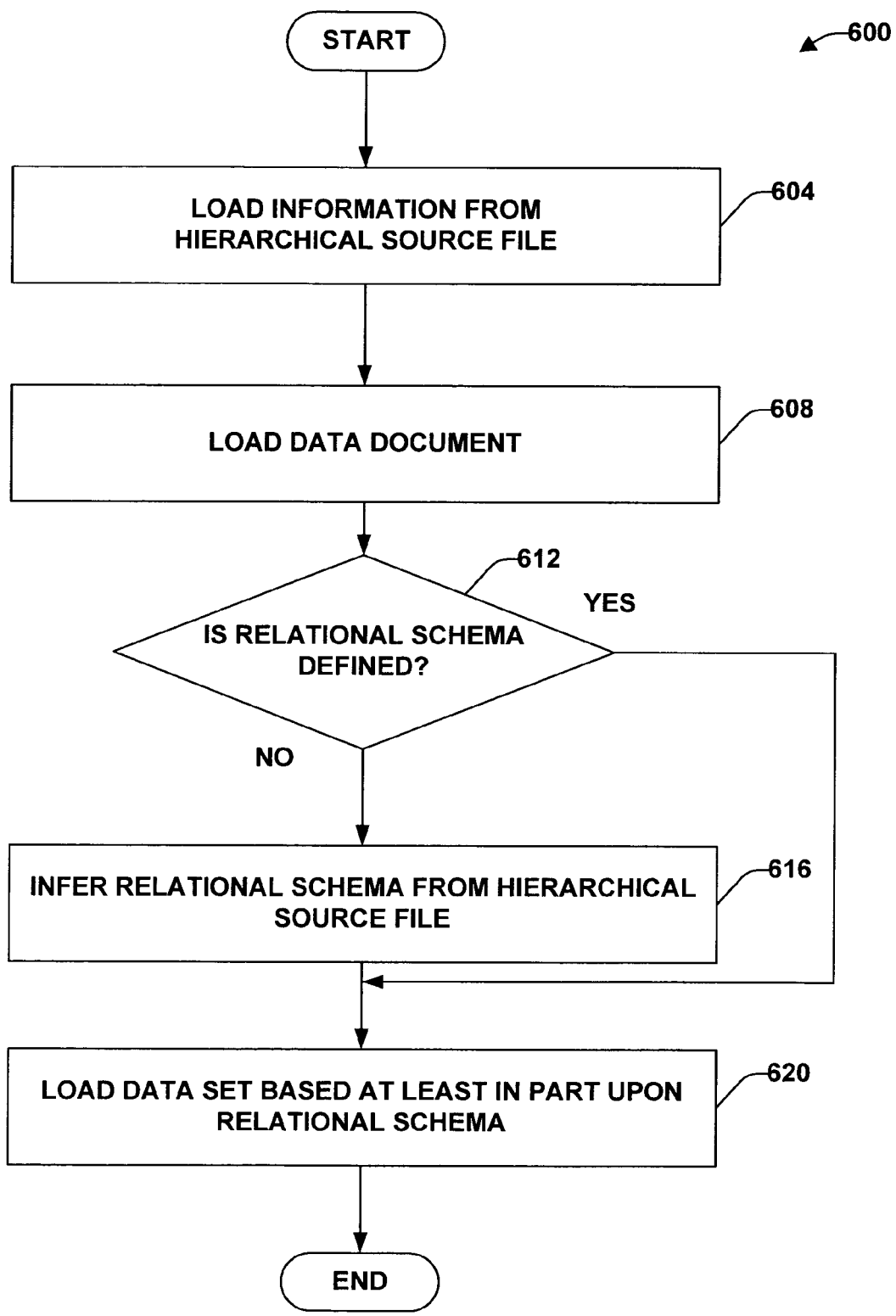
FIG. 6 is a flow chart illustrating a methodology for accessing hierarchical data in a structured and unstructured manner in accordance with an aspect of the present invention.
Figure 7:
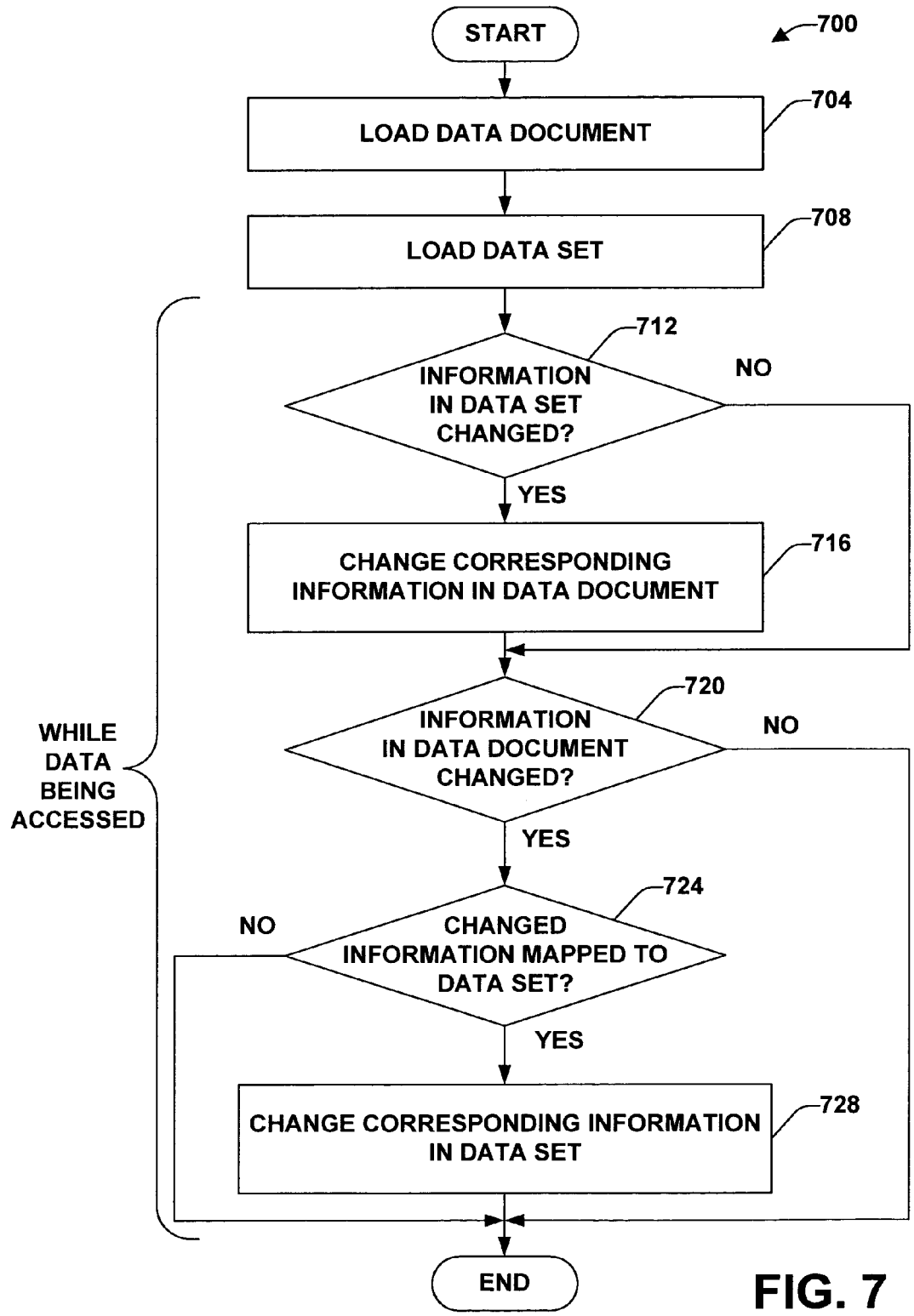
FIG. 7 is a flow chart illustrating a methodology for accessing data in a structured and unstructured manner in accordance with an aspect of the present invention.
Figure 8:
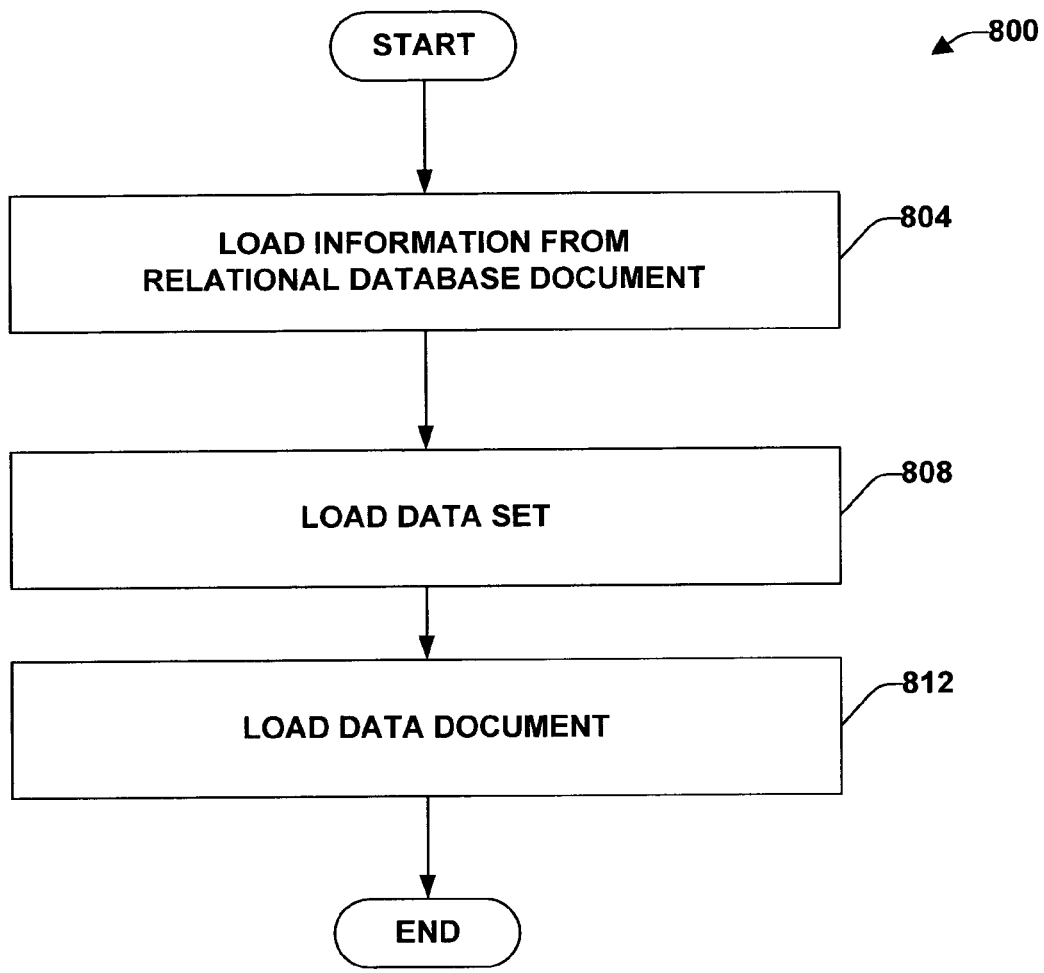
FIG. 8 is a flow chart illustrating a methodology for accessing relational data in a structured and unstructured manner in accordance with an aspect of the present invention.

In view of the exemplary systems shown and described above, methodologies that may be implemented in accordance with the present invention will be better appreciated with reference to the flow charts of FIGS. 6, 7 & 8. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Turning to FIG. 6, a methodology 600 for accessing hierarchical data in a structured and unstructured manner in accordance with an aspect of the present invention is illustrated. At 604, information is loaded from a hierarchical source file (e.g., XML document). At 608, a data document is loaded from the hierarchical source file allowing for unstructured access of data stored in the hierarchical source file. At 612, a determination is made whether a relational schema has been defined (e.g., in the hierarchical source file). If the determination at 612 is YES, processing continues at 620. If the determination at 612 is NO, at 616 a relational schema is inferred from the hierarchical source file. Next, at 620, a data set is loaded based at least in part upon the relational schema, thus allowing for access of data in the hierarchical source file in a structured (relational) manner.

Referring next to FIG. 7, a methodology 700 for accessing data in a structured and unstructured manner in accordance with an aspect of the present invention is illustrated. At 704, a data document is loaded (e.g., in memory unstructured representation of hierarchical source file and/or relational database document). At 708, a data set is loaded (e.g., in memory structured representation of hierarchical source file and/or relational database document). While data is being accessed, processing continues from 712 through 728. At 712, a determination is made as to whether information in the data set (e.g., structured representation of data) has changed. If the determination at 712 is NO, processing continues at 720. If the determination at 712 is YES, at 716, corresponding information in the data document (e.g., unstructured representation of data) is changed. At 720, a determination is made as to whether information in the data document (e.g., unstructured representation of data) has changed. If the determination at 720 is NO, processing continues at 712. If the determination at 720 is YES, at 724, a determination is made as to whether the changed information in the data document is mapped to the data set (e.g., included within the structured representation of data). If the determination at 724 is NO, processing continues at 712. If the determination 724 is YES, corresponding information in the data set (e.g., structured representation of data) is changed.

Turning to FIG. 8, a methodology 800 for accessing relational data in a structured and unstructured manner in accordance with an aspect of the present invention is illustrated. At 804, information from a relational database document is loaded. At 808, a data set is loaded based upon information associated with the relational database document (e.g., in memory structured representation of data from the relational database document). At 812, a data document is loaded based upon information associated with the relational database document (e.g., in memory unstructured representation of data from the relational database document.)

Figure 9:
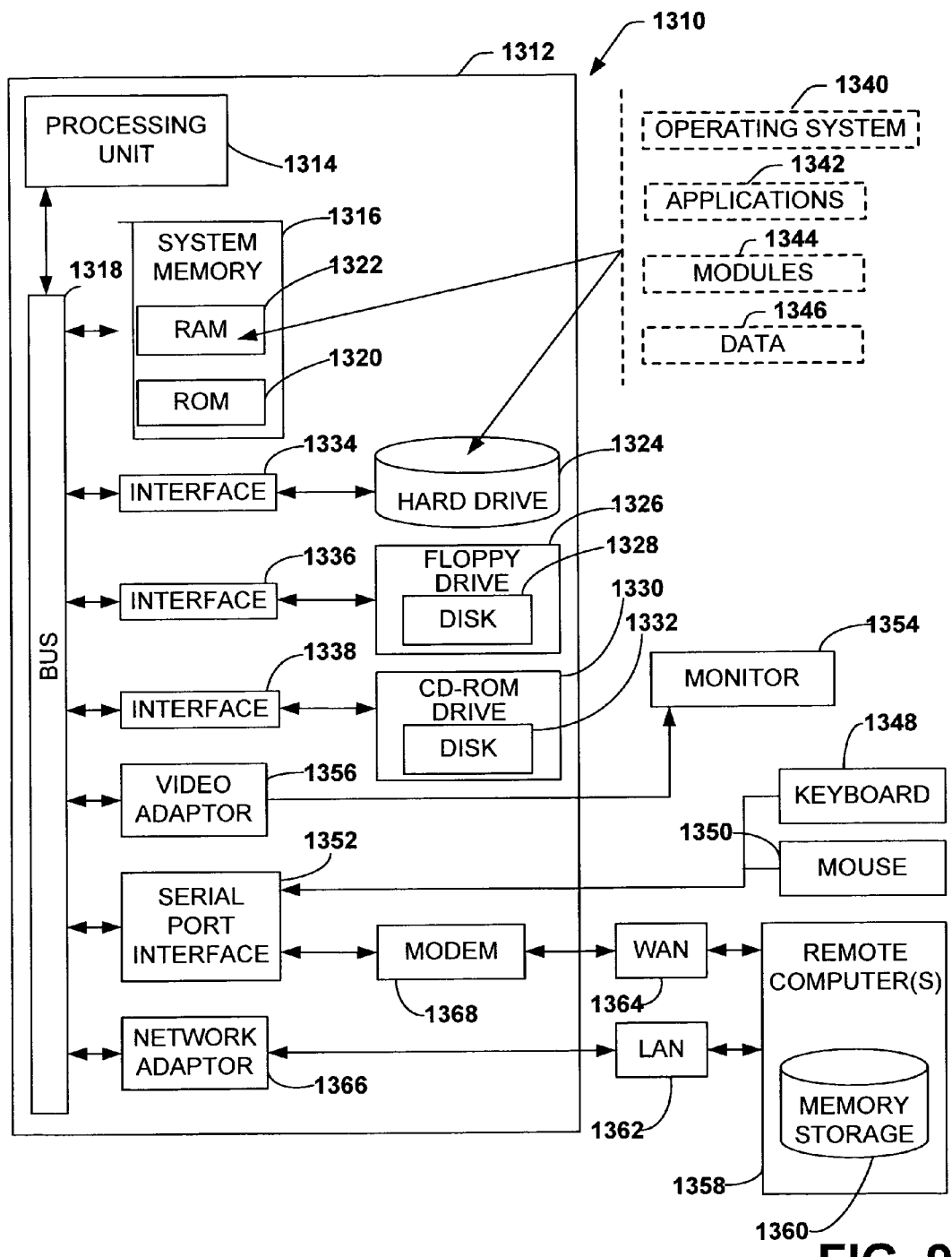
FIG. 9 is a schematic block diagram of an exemplary operating environment for a system configured in accordance with the present invention.

In order to provide additional context for various aspects of the present invention, FIG. 9 and the following discussion are intended to provide a brief, general description of one possible suitable computing environment 1310 in which the various aspects of the present invention may be implemented. It is to be appreciated that the computing environment 1310 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 9 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 9, an exemplary environment 1310 for implementing various aspects of the invention includes a computer 1312, including a processing unit 1314, a system memory 1316, and a system bus 1318 that couples various system components including the system memory to the processing unit 1314. The processing unit 1314 may be any of various commercially available processors. Dual microprocessors and other multi-processor architectures also can be used as the processing unit 1314.

The system bus 1318 may be any of several types of bus structure including a memory bus or memory controller, a peripheral bus, and a local bus using any of a variety of commercially available bus architectures. The computer memory 1316 includes read only memory (ROM) 1320 and random access memory (RAM) 1322. A basic input/output system (BIOS), containing the basic routines that help to transfer information between elements within the computer 1312, such as during start-up, is stored in ROM 1320.

The computer 1312 may further include a hard disk drive 1324, a magnetic disk drive 1326, e.g., to read from or write to a removable disk 1328, and an optical disk drive 1330, e.g., for reading a CD-ROM disk 1332 or to read from or write to other optical media. The hard disk drive 1324, magnetic disk drive 1326, and optical disk drive 1330 are connected to the system bus 1318 by a hard disk drive interface 1334, a magnetic disk drive interface 1336, and an optical drive interface 1338, respectively. The computer 1312 typically includes at least some form of computer readable media. Computer readable media can be any available media that can be accessed by the computer 1312. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1312. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1322, including an operating system 1340, one or more application programs 1342, other program modules 1344, and program non-interrupt data 1346. The operating system 1340 in the computer 1312 can be any of a number of commercially available operating systems.

A user may enter commands and information into the computer 1312 through a keyboard 1348 and a pointing device, such as a mouse 1350. Other input devices (not shown) may include a microphone, an IR remote control, a joystick, a game pad, a satellite dish, a scanner, or the like. These and other input devices are often connected to the processing unit 1314 through a serial port interface 1352 that is coupled to the system bus 1318, but may be connected by other interfaces, such as a parallel port, a game port, a universal serial bus ("USB"), an IR interface, etc. A monitor 1354, or other type of display device, is also connected to the system bus 1318 via an interface, such as a video adapter 1356. In addition to the monitor, a computer typically includes other peripheral output devices (not shown), such as speakers, printers etc.

The computer 1312 may operate in a networked environment using logical and/or physical connections to one or more remote computers, such as a remote computer(s) 1358. The remote computer(s) 1358 may be a workstation, a server computer, a router, a personal computer, microprocessor based entertainment appliance, a peer device or other common network node, and typically includes many or all of the elements described relative to the computer 1312, although, for purposes of brevity, only a memory storage device 1360 is illustrated. The logical connections depicted include a local area network (LAN) 1362 and a wide area network (WAN) 1364. Such networking environments are commonplace in offices, enterprise-wide computer networks, intranets and the Internet.

When used in a LAN networking environment, the computer 1312 is connected to the local network 1362 through a network interface or adapter 1366. When used in a WAN networking environment, the computer 1312 typically includes a modem 1368, or is connected to a communications server on the LAN, or has other means for establishing communications over the WAN 1364, such as the Internet. The modem 1368, which may be internal or external, is connected to the system bus 1318 via the serial port interface 1352. In a networked environment, program modules depicted relative to the computer 1312, or portions thereof, may be stored in the remote memory storage device 1360. It will be appreciated that the network connections shown are exemplary and other means of establishing a communications link between the computers may be used.

Figure 10:
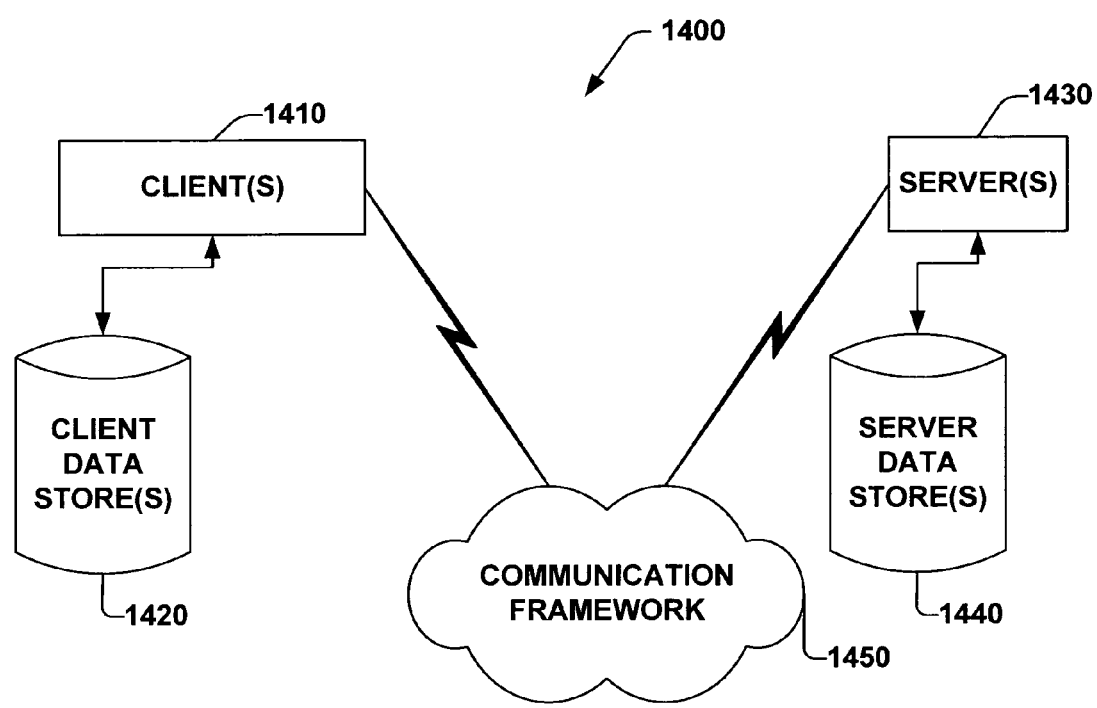
FIG. 10 is a schematic block diagram of an exemplary communication environment for a method performing in accordance with the present invention.

FIG. 10 is a schematic block diagram of a sample computing environment 1400 with which the present invention may interact. The system 1400 includes one or more clients 1410. The clients 1410 may be hardware and/or software (e.g., threads, processes, computing devices). The system 1400 also includes one or more servers 1430. The servers 1430 may also be hardware and/or software (e.g., threads, processes, computing devices).

The system 1400 includes a communication framework 1450 that can be employed to facilitate communications between the clients 1410 and the servers 1430. The clients 1410 are operably connected to one or more client data stores 1415 that can be employed to store information local to the clients 1410. Similarly, the servers 1430 are operably connected to one or more server data stores 1440 that can be employed to store information local to the servers 1430.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. At a computer system including a processor and system memory, a computer-implemented method for accessing data, comprising:
   parsing a hierarchical source document into a data document that comprises a hierarchical representation of the source document;
   loading, by the processor, information associated with the parsed hierarchical source document into a hierarchical, unstructured data document such that the data document comprises an unstructured hierarchical representation of the information associated with the hierarchical source document;
   parsing the same hierarchical source document into a data set that comprises a relational representation of the source document;
   loading information associated with the parsed hierarchical source document into the relational, structured data set such that the data set comprises a structured relational representation of at least some of the information associated with the hierarchical source document, wherein the structured relational representation is defined by a schema that is inferred based on information associated with the hierarchical source document; and
   accessing the information in the hierarchical source document in at least one of the following manners using a software service: as structured data via the structured data set or as unstructured, hierarchical data via the unstructured data document, wherein any changes to the data document are only reflected in the information stored in the data set if the changed data is associated with the relational data stored in the data set, such that integrity of the source document is maintained in the data stored in the data document while the data set maintains at least a subset of the information associated with the source document.

2. The method of claim 1, further comprising:
   synchronizing a change made to information stored in the data set to corresponding information stored in the data document.

3. The method of claim 1, further comprising:
   accessing the relational representation of information associated with the source document stored in the data set utilizing a designer.

4. The method of claim 1, further comprising synchronizing a change made to information stored in the data document to corresponding information stored in the data set if the changed information is included in the data set.

5. The method of claim 1, further comprising:
   associating a region of the hierarchical representation of data with a row of the data set having a relational representation; and
   correlating a subset of the region with a state, the state being one of: (1) the subset being mapped to an element of the data set; (2) the subset being mapped to the row of the data set; and (3) the subset being unmapped to the data set, a topmost node of the associated region is an element with a local name and namespace as at least one corresponding property of an associated data table in the data set.

6. The method of claim 1, the source document includes at least one of an XML document or a database.

7. The method of claim 1, further comprising determining a defined relational schema, loading information associated with the source document into a data set takes place according to the determined schema.

8. The method of claim 1, further comprising:
   parsing information associated with a source document, at least a portion of the parsed information loads into the data document and at least a portion of the parsed information load into the data set;
   allowing a user to gain access to the loaded information; the source document includes an XML document.

9. A system facilitating access to data, comprising:
   a computer processor;
   a system memory;
   a first storing module for storing a hierarchical source document as a hierarchical, unstructured data document such that the data document comprises an unstructured hierarchical representation of data associated with the hierarchical source document;
   a second storing module for storing at least a portion of the same hierarchical source document as a relational, parsed, structured data set such that the data set comprises a structured relational representation of data, wherein the structured relational representation is defined by a schema that is inferred based on information associated with the hierarchical source document;
   an accessing module comprising a software service for accessing at least one of the hierarchical, unstructured representation of data and the relational, structured representation of data in at least one of the following manners: as structured data via the structured data set or as unstructured, hierarchical data via the unstructured data document; and
   a synchronizing module for synchronizing a change to the relational, structured representation of data with the hierarchical, unstructured representation of data, wherein any changes to the data document are only reflected in the information stored in the data set if the changed data is associated with the relational data stored in the data set, such that integrity of the source document is maintained in the data stored in the data document while the data set maintains at least a subset of the information associated with the source document.

10. The system of claim 9, further comprising a second synchronizing module for synchronizing a change to the hierarchical representation of data with the relational representation of data.

11. The system of claim 9, further comprising: a first loading module for loading information associated with the source document into the data document having the hierarchical representation of information associated with the source document;
    a second loading module for loading information associated with the source document into the data set having the relational representation of at least some of the information associated with the source document;
    a first accessing module for accessing the hierarchical representation of information associated with the source document stored in the data document utilizing a service;
    a second accessing module for accessing the relational representation of information associated with the source document stored in the data set utilizing a designer;
    a first associating module for associating a region of a hierarchical representation of data with a row of a relational data set;
    a correlating module for correlating a subset of the region with a state, the state being one of: (1) the subset being mapped to an element of the data set; (2) the subset being mapped to the row of the data set; and (3) the subset being unmapped to the data set;
    a second associating module for associating the region of the hierarchical representation of data with the row of the relational data set includes mapping the region of the hierarchical representation of data with the row of the relational data set; and
    a mapping module for mapping an attribute to a column or field, a value of the column or field is a value of the attribute.

12. At a computer system including a processor and system memory, a computer-implemented method for accessing data, comprising:
    parsing a hierarchical source document into a data document that comprises a hierarchical representation of the source document;
    loading, by the processor, information associated with the parsed hierarchical source document into a hierarchical, unstructured data document such that the data document comprises an unstructured hierarchical representation of the information associated with the hierarchical source document;
    parsing the same hierarchical source document into a data set that comprises a relational representation of the source document;
    loading information associated with the parsed hierarchical source document into the relational, structured data set such that the data set comprises a structured relational representation of at least some of the information associated with the hierarchical source document, wherein the structured relational representation is defined by a schema that is inferred based on information associated with the hierarchical source document;
    associating a region of the hierarchical, unstructured representation of data with a row of the relational, structured data set;
    correlating a subset of the region with a state, the state being one of: (1) the subset being mapped to an element of the data set; (2) the subset being mapped to the row of the data set; and (3) the subset being unmapped to the data set, a topmost node of the associated region is an element with a local name and namespace as at least one corresponding property of an associated data table in a data set component; and
    accessing the associated region of a hierarchical representation of data in at least one of the following manners using a software service: as structured data via the structured data set or as unstructured, hierarchical data via the unstructured data document, wherein any changes to the data document are only reflected in the information stored in the data set if the changed data is associated with the relational data stored in the data set, such that integrity of the source document is maintained in the data stored in the data document while the data set maintains at least a subset of the information associated with the source document.

13. The method of claim 12, the subset comprising at least one of: an element and an attribute.

14. The method of claim 12, the subset being mapped to a corresponding column of the data set.

15. The method of claim 12, the subset being mapped to a corresponding row of the data set.

16. The method of claim 12, further comprising ignoring unmapped information from the hierarchical representation of the data.

17. The method of claim 12, associating the region of the hierarchical representation of data with the row of the relational data set includes mapping the region of the hierarchical representation of data with the row of the relational data set;
    within the region, at least one element or attribute is mapped to at least one corresponding column or field of the row of data in a data set component;
    if more than one element has a same corresponding column or field, then a first occurrence of the element is mapped to the data set component with at least one remaining occurrence not mapped into the data set component;
    mapping an attribute to a column or field, a value of the column or field is a value of the attribute.

\* \* \* \* \*